March 6, 1928.　　　　　　　　　　　　　　　　　　　1,662,016
J. A. SHIVELY
TIRE BUILDING MACHINE
Filed July 20, 1926　　　　　　　2 Sheets-Sheet 1

Inventor
Jess A. Shively.
By R. O. Trogner
Attorney

March 6, 1928.　　　　　J. A. SHIVELY　　　　　1,662,016
TIRE BUILDING MACHINE
Filed July 20, 1926　　　2 Sheets-Sheet 2
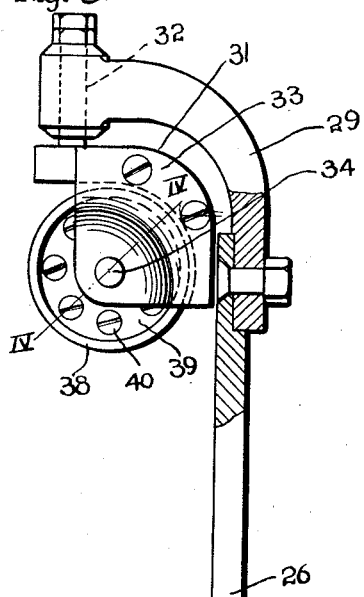
Fig. 3.
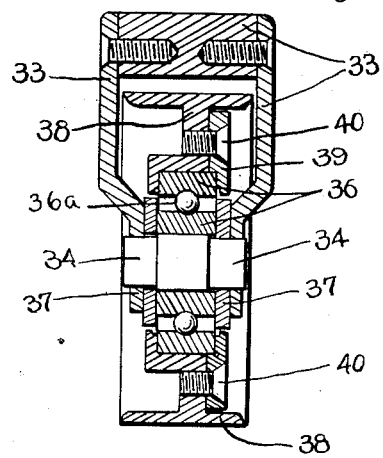
Fig. 4.
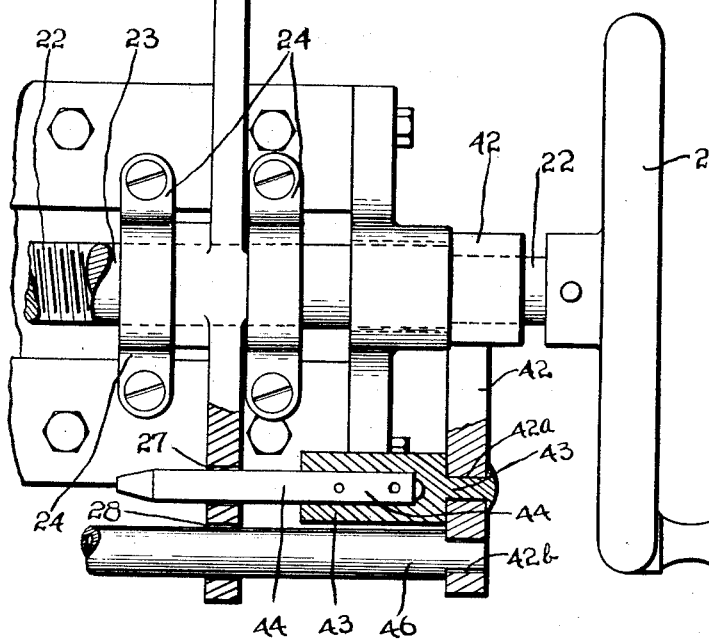
INVENTOR
Jess A. Shively.
ATTORNEY Patented Mar. 6, 1928.

1,662,016

UNITED STATES PATENT OFFICE.

JESS A. SHIVELY, OF AKRON, OHIO, ASSIGNOR TO THE GOODYEAR TIRE & RUBBER COMPANY, OF AKRON, OHIO, A CORPORATION OF OHIO.

TIRE-BUILDING MACHINE.

Application filed July 20, 1926. Serial No. 123,651.

My invention relates to tire building machines and it has particular relation to that portion of a machine of the above designated character which is adapted to perform the stitching operations incident to the fabrication of pneumatic tire casings.

The invention has for its object the provision of a device which is capable of performing all of the stitching operations incident to the building of a pneumatic tire.

Another object of my invention is to provide a universally adaptable stitching device which is simple in its construction and effective in its operation.

A further object of my invention is to provide a stitching device which is capable of applying or tying in the bead portions of a tire casing without resorting to the employment of manually operated tools.

My invention is primarily concerned with tire building machines having a cylindrical or so-called flat mandrel or drum and particularly with that type of drum having an outwardly beveled edge, although the application of the invention may readily be extended to include the so-called "core type" machines. A structure built according to my invention is characterized by the fact that it is capable of performing all of the stitching operations including the stitching of plies, chafing strips, breaker and tread, as well as tying in and anchoring of the beads with respect to the edges of the plies of fabric and chafing strips.

Heretofore an operator employing the so-called "band method" for assembling the various elements constituting a pneumatic tire required a machine that was equipped with stitching mechanisms, hand tools and blunt edged devices of widely differing design in order to effectuate a complete tire building operation. These are entirely eliminated by employing the device designed according to my invention, which device is of universal utility in the art of pneumatic tire fabrication. It may be employed to the best advantage perhaps in conjunction with the method of building tires described in a copending application Serial No. 95,060, filed March 16, 1926, and assigned to the Goodyear Tire & Rubber Company.

For a better understanding of the principles of my invention, reference may now be had to the accompanying drawings forming a part of this specification, in which:

Fig. 3 is a front elevational view, on a larger scale, partially in cross-section illustrating the stitching castor and its mounting; and Fig. 4 is a cross-sectional view of the castor, taken substantially along the line IV—IV of Fig. 3.

Figure 1:
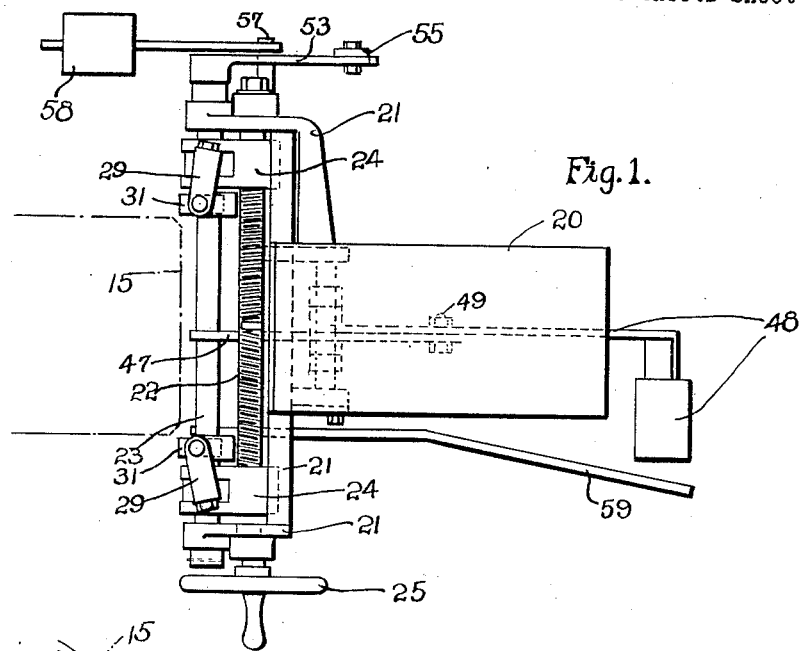
Fig. 1 is a plan view of the structure embodying one form which my invention may assume and illustrates the relation of the stitching elements to the core of the tire building machine.

A tire building machine includes a rotatable drum 15 adapted to be driven from some suitable source of power together with an adaptable stitching device. The structure illustrated is mounted upon a standard or table-like frame 20, to which is secured a set of horizontal brackets 21 having journals for two rotatable shafts 22 and 23. The shaft 22 is screw-threaded in opposite directions from its mid-portion and is provided with two bifurcated collar members 24 mounted thereon. The collars are actuated linearly when the shaft is rotated, by means of a hand wheel 25 that is keyed to one end thereof. Arms 26 are disposed within the bifurcated portions of the respective collars 24 and are slidably mounted on the shaft 23. Also each arm member 26 is pivotable in planes perpendicular to the axis of the drum 15. As best shown in Fig. 3 the lower portion of the member 26 has two openings 27 and 28 formed therein. An arcuate member 29 is bolted to the upper end of the arm 26 and is provided with a revolvably suspended stitcher castor 31. The castor includes a vertical shank 32 which is rotatably mounted within the arcuate member 29 and which in turn is provided with a journal supporting member 33 rigidly secured thereto. A stud shaft 34 mounted in the journal 33 rotatably supports ball-bearing races 36. It will be observed, particularly by reference to Fig. 4, that ball or roller elements 36ª are disposed between the races 36 and that the latter are spaced from the sides of the journal member 33 by means of washers 37. To the outer ring of the ball bearing a flanged or cupped annular member 38 is secured that engages the tire components to be stitched. This member is secured to the bearing by means of a washer 39 and screws 40.

An arm 42 having two openings 42$^a$ and 42$^b$ is keyed to each end of the shaft 23. In the one opening 42$^a$ is riveted a block 43, wherein a tapered pin 44 is secured. The pin is centered to fit snugly within the opening 27 in the arm 26. In the other opening 42$^b$ of the arm 42, a reduced end portion of a rod 46 is loosely housed, thereby providing considerable play between the rod 46 and arm 42. Also the rod 42 is slidably disposed within the opening 28 of the arm 26. To the mid portion of this rod one end of a link 47 is joined which also acts as a fulcrum for the loosely supported rod 46. The other end of the link is pivotably secured to a pedal 48, as indicated at 49, and is fulcrumed in the frame at 50. A spring 51 interconnects the frame with the pedal, thereby normally maintaining the latter in a raised position.

At one end of the shaft 23 an arm 53 is secured, which is connected to an arm 54 by means of link 55. One end of the arm 54 is rigidly secured to a shaft 57, which is rotatably bracketed to the frame 20 and is disposed directly below the shaft 22. Opposite ends of the shaft 57 are respectively provided with a counterweight 58 and a handle 59, both of which are rigidly secured to the shaft and extend substantially horizontally in opposite directions.

The operation of my machine is relatively simple. Briefly, the operator superimposes any given number of plies about the drum 15 which are stitched down by causing the rollers 38 to engage the mid portion of the drum. The rollers are actuated, while the drum is rotated by lowering the pedal 48. At the same time, the stitcher arms 26 are moved in opposite directions toward the edges of the drum by rotating the screw-threaded shaft 22 by means of the hand wheel 25. By reason of the play between the reduced end portions of the rod 46 and the openings 42$^b$ provided therefor in the arm 42, the rollers, although coacting, are permitted to have a limited independent movement with respect to each other so that the effects of irregularities of the surface engaged by one of the rollers are not transmitted to the other. However, after the arms 26 move outwardly until the tapered pins 44 extend through the openings 27 of the arm 26, they operate as a unit, for the reason that the fit of the pins within the openings 27 is snug and each pin is rigid with the arm 42. Moreover, the arms 42 in turn are keyed to a common shaft 23. Continued outward movement brings the rollers into engagement with the beveled portion of the drum. The swivel connection, however, permits the stitcher to adjust itself into a plane perpendicular to the surface being stitched, thus enabling the builder to complete the operation, so that the edges of the stitched plies overlap the edges of the drum.

Figure 2:
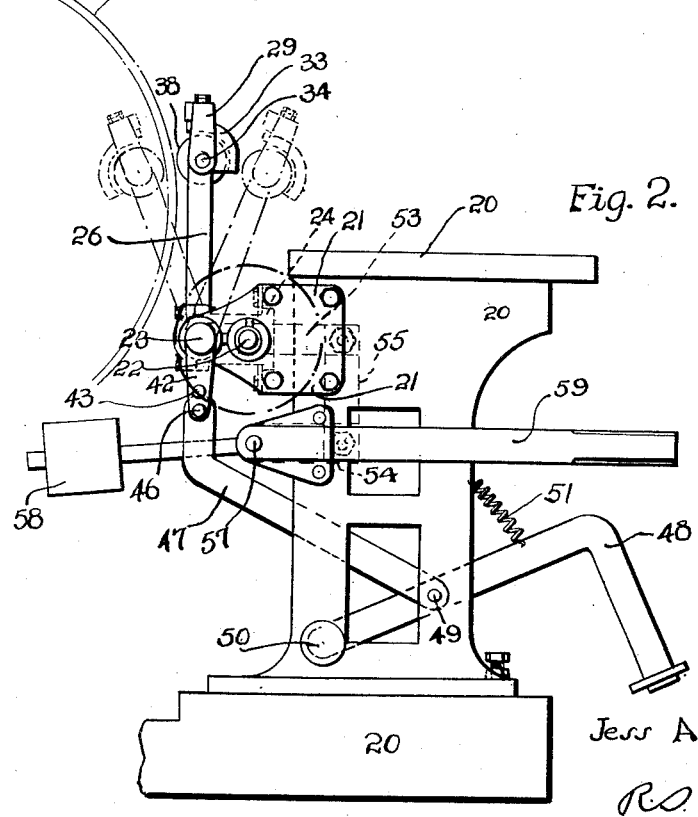
Fig. 2 is a side elevational view of the stitcher mechanism illustrated in Fig. 1.

Subsequently beads are positioned against the beveled portion of the drum and over the edge portion of the plies. The beads are relatively irregular in contour and in order properly to stitch the fabric over them it is essential that the operator be able to control the movements and pressure of the stitcher rollers with a higher degree of precision than is attainable with the pedal 48. Hence, while stitching the beads, the operator controls the stitchers by means of the handle 59 instead of the pedal. To tie in the beads with the edge portions, the stitchers are separated to position them opposite the beads, and, by raising the handle 59, they are pivoted in a counter-clockwise direction, as illustrated in Fig. 2. In this position the stitchers will have pivoted through 180°, after which they are brought into contact with the inner peripheries of the edges of the plies. These edges, as has been noted, extend beyond the beveled portion of the rotated drum. By lowering the handle 59 and rotating the hand wheel 25, whereby the stitchers will approach each other, the tying in operation is effected. The remaining elements constituting the tire are then superimposed and stitched into position. During this last operation the chafing strips and bands which overlap the tied in bead are assembled and stitched about the bead portion of the tire adjacent the bevel of the drum, by the rollers.

While I have described the operation of the stitcher device embodying the principles of my invention in connection with a mandrel or drum having outwardly beveled edge portions, other types of mandrels may be employed. Moreover, it will be apparent that the invention is susceptible to many modifications without departing from its scope. Wherefore, I desire that it be limited only to accord with the prior art and the appended claims.

What I claim is:

1. A tire building machine comprising a rotatable drum, and a stitcher device including a pair of arms movable along a line parallel to the axis of the drum and pivotable to swing in planes perpendicular to the axis of the drum, and a stitcher having a swivel connection rotatably mounted on each arm.

2. A tire building machine comprising a rotatable drum, and a stitcher device including an arm adapted to swing the stitcher into engagement with the drum and movable along a line parallel to the axis thereof, and a stitcher member having a swivel connection with the arm in a plane perpendicular to the axis of the drum, whereby to permit the stitcher to adjust itself automatically to the contour of the surface being stitched.

3. A tire building machine comprising a rotatable drum and a stitcher device including an arm adapted to swing the stitcher into engagement with the drum and movable along a line parallel to the axis thereof, and a stitcher attached to the arm by a swivel connection to permit the stitcher to adjust itself automatically to a proper angle with respect to the surface being stitched.

4. A tire building machine having a rotatable drum, arms movably mounted adjacent the drum, and stitcher elements each comprising a rotatable stitcher disc provided with a substantially cylindrical periphery revolvably mounted upon a member swiveled to an arm to rotate about an axis in a plane perpendicular to the axis of the drum, the arms being adapted to bring the disc into contact with the drum.

5. A tire making machine comprising a rotatable drum, stitcher arms mounted upon guides parallel to the axis of the drum and adapted to move into contact with the drum, bifurcated blocks having a swivel attachment to the arms, stitcher rollers journalled in the bifurcated blocks, and means to actuate the stitcher arms to cause them to travel along the guides.

6. A tire making machine comprising a rotatable tire mandrel, stitcher arms mounted upon guides parallel to the axis of the mandrel, stitchers mounted upon the arms, means to move the arms to cause the stitchers to contact with the tire upon the mandrel, said means including a pedal associated with the stitcher arms to move the latter toward the drum when the tire tread is being stitched, and a hand lever associated with the arms to actuate them while the tire beads are being stitched.

7. A tire making machine comprising a rotatable tire mandrel, a pair of guide rods arranged in parallel relation with respect to the axis of the mandrel, stitcher arms slidably secured upon the guide rods, one of said guide rods being mounted upon arms secured to the other guide rod so that it may rotate about the latter, and one of the guide rods being capable of a slight independent movement with respect to the other, so as to permit a limited independent motion between the stitcher arms.

8. A tire building machine comprising a rotatable cylindrical drum, a stitcher mechanism mounted adjacent the cylindrical drum, said mechanism comprising a pair of stitcher arms mounted adjacent the drum, means to move the arms simultaneously along the face of the drum, and means to pivot the arms as a unit toward the drum, the latter means being constructed to permit a slight movement of the arms away from or toward the drum independently of each other.

In witness whereof, I have hereunto signed my name.

JESS A. SHIVELY.